United States Patent
Ramachandran et al.

(10) Patent No.: US 6,286,010 B1
(45) Date of Patent: Sep. 4, 2001

(54) METHODS AND APPARATUSES FOR INTERACTION BETWEEN SCHEMATA

(75) Inventors: Lakshmi Ramachandran; Kompella Anasuya Devi, both of Bangalore; Vipul Arunkant Modi, Ahmedabad; Anurag Srivastava, Bangalore, all of (IN)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/255,614

(22) Filed: Feb. 19, 1999

(51) Int. Cl.[7] .................................................. G06F 17/30
(52) U.S. Cl. ................................................ 707/103; 707/2
(58) Field of Search ..................... 707/100, 103, 707/2

(56) References Cited

U.S. PATENT DOCUMENTS

| | | | |
|---|---|---|---|
| 5,481,718 | * | 1/1996 | Ryu et al. ............................ 709/316 |
| 5,615,400 | * | 3/1997 | Cowsar et al. ...................... 709/332 |
| 5,802,291 | * | 9/1998 | Balick et al. ........................ 709/202 |
| 5,872,914 | * | 2/1999 | Walker, Jr. et al. ................. 713/202 |
| 5,878,411 | * | 3/1999 | Burroughs et al. .................... 707/4 |

OTHER PUBLICATIONS

Novell's Guide to NetWare 4.1 Networks, Jeffrey F. Hughes and Blair W. Thomas, chapters 3 and 4, 1996.*
Novell Leans on directory. Ben Heskett, Sep. 16, 1998. www.news.com:80/News/Item/0,4,26452,00.html.
Novell advances directory services. Ben Heskett, Oct. 22, 1998. www.news.com:80/News/Item/0,4,27847,00.html.
The NDS Advantage: Snap Shot. Novell website. www.novell.com/advantage/nds/nds-snapshot.html. No date.
NDS Speaker Notes. Paul Corriveau. www.novell.com/products/preview/nds/text.html. No date.
Concept Research On A Personal Internet Directory (PID). Novell website. www.novell.com/technology/pid.html No date.

* cited by examiner

Primary Examiner—Jack Choules
Assistant Examiner—Cheryl Lewis
(74) Attorney, Agent, or Firm—Dinsmore & Shohl LLP

(57) ABSTRACT

A method and apparatus for managing and updating distributed directory objects is disclosed. The object oriented directory has a schema which has a first and second class. The schema has a schema engine which contains the method for managing and updating the distributed directory objects utilizing semantic and structural comparisons. The schema engine utilizes and updates the first and second classes of the object oriented directory.

24 Claims, 13 Drawing Sheets

METHODS AND APPARATUSES FOR INTERACTION BETWEEN SCHEMATA

TECHNICAL FIELD

The present invention relates generally to managing and updating distributed directories; and will specifically be disclosed as methods and apparatuses for interaction between schemata in distributed directories.

BACKGROUND OF THE INVENTION

The virtual explosion of technical advances in microelectronics, digital computers and software have changed the face of modern society. In fact, these technological advances have become so important and pervasive that this explosion is sometimes referred to as "the information revolution." Through telephone lines, networks, satellite communications and the like, information and resources are ever increasingly being accessed and shared.

When a group of computers are connected to one another, such as in a client/server network, a management service is typically used to organize and administer information and resources across the network. Management services usually access or include a database having a collection of objects that represent a variety of things. For instance, some typical objects represent users, groups, printers, computers, and the like. Objects in a management service are often organized in flat domains such as the SECURITY ACCOUNTS MANAGER ("SAM") of WINDOWS NT, in a distributed directory such as NOVELL DIRECTORY SERVICES ("NDS"), or in other ways known in the art. Each management service object has at least one associated attribute with one or more associated values. Generally, each attribute has an attribute syntax such that the value associated with the attribute is of a data type corresponding to the attribute syntax. For example, integer values are associated with integer attributes.

Typically, each object is of a particular type and is created from a corresponding class. For example, a User object would be created from a User class, a Printer object would be created from a Printer class, etc. The object classes provide a kind of template to define the various attributes that will be associated with the objects. Building on the prior example, an object created from the User class could have the following attributes: Given Name, Last Name, Title, telephone Number, etc. When an object is created from a class, values are filled into the various attributes of the class, thereby creating an instance of the class. For example, a User object could have the value "Owen" associated with the attribute Given Name.

Typically, the structure of the distributed directory is governed by a schema. The schema defines the rules for adding and managing objects and attributes of objects in the distributed directory. These rules are specified through a data dictionary that provides a standard set of data types or classes from which objects can be created. Each object in the distributed directory belongs to an object class that specifies which attributes are associated with the object. Generally, the schema is extensible so that it may be tailored to modify existing classes or add new classes.

The schema controls not only the structure of the individual objects, but also the relationship among the objects in the distributed directory. In controlling this relationship, the schema specifies subordination among object classes. That is, for every object there is a group of object classes from which subordinate objects can be formed. Objects that can contain other objects are called container objects, which are building blocks of the distributive directory. Objects that cannot contain other objects are known as non-container or leaf objects.

With the growing use of the Internet, there is a need for directories on the Internet to provide support for schema independence. Schema independence means support for storage and retrieval of the desired information in the directory in the way that the user/owner wants to store or retrieve it. For example, one schema may store telephone numbers under the object phone_number and another schema as telephone_number or contact_number. When the first directory wants to access and retrieve the phone_ number from the second directory nothing will be returned as the directories are unaware that each directory has named the same information a different name. Therefore, there is a need for adaptive schema supported directories.

SUMMARY OF THE INVENTION

Accordingly, an object of the invention is to provide a method and apparatus for interaction between schemata.

A further object of the invention is to provide an improved data structure for representing objects.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed in the appended claims.

One aspect of the present invention is an object oriented directory for use with a computer network. The object oriented directory has a schema which has a first and second class. An object is instantiated from the first class and another object is instantiated from the second class. A reference is associated with the object from the first class of the schema of one directory with an object from a first class of another schema in a second directory. The reference further relates the objects of the first directory to the objects of the second directory.

Another aspect of the present invention is a method for interacting between a first directory having a first schema and a second directory having a second schema. A first object is instantiated from a first class of a first schema from a first directory. Another object is instantiated from a first class of a second schema from a second directory. The second schema is distinct from the first schema. Equivalence of the objects is determined. The objects are associated to each other if they are determined to be equivalent.

A further aspect of the present invention is the enhancing/ associating of the individual schemata of the distributive directories if the objects are equivalent. The first class of the first schema from the first directory is copied to the reference of the first class of the second schema from the second directory. Likewise, the reference of the first class of the second schema from the second directory is copied to the reference of the first class of the first schema from the first directory.

Another further aspect of the present invention is the further enhancing/associating of the individual schema of the distributive directories if the objects are equivalent. The second class of the first schema from the first directory is copied to the second class of the second schema from the second directory. Likewise, the second class of the second schema from the second directory is copied to the second class of the first schema from the first directory.

Yet another aspect of the present invention is a method for determining structural equivalence of the objects. A first comparison class is instantiated from a second class of the first schema from the first directory. This first comparison class contains attributes of the first object of the first directory. A second comparison class is instantiated from a second class of the second schema from the second directory. This second comparison class contains attributes of the first object of the second directory. Structural equivalence of the comparison classes is determined by comparison of the first comparison class with the second comparison class. A structural equivalence match is obtained when greater than a specified percent (configurable by client and/or server) of the attributes of the first comparison class match the attributes of the second comparison class. Another method for structural equivalence can be determined by comparison of the attribute type or syntax of the associated object. If a structural match has been obtained, the objects from the second class of the schemata are associated with each other.

Still other aspects of the present invention will become apparent to those skilled in the art from the following description of a preferred embodiment, which is by way of illustration, one of best modes contemplated for carrying out the invention. As will be realized, the invention is capable of other different and obvious aspects, all without departing from the invention. Accordingly, the drawings and descriptions are illustrative in nature and are not restrictive.

BRIEF DESCRIPTION OF THE DRAWINGS

Reference will now be made to the present preferred embodiment of the invention, an example of which is illustrated in the accompanying drawings, wherein like numerals indicate the same element throughout the views.

DETAILED DESCRIPTION OF THE PREFERRED EMBODIMENTS

Often computers telecommunicate between each other and share information, applications and/or services. Sometimes in this setting, the various computers are referred to as nodes, which is a generic term referring to a point in a interconnected system. One type of computer network employs a client/server architecture, wherein the portions of network applications that interact with human users are typically separated from the portions of network applications that process requests and information. Often, the portions of an application that interact with users or access network resources are called client applications or client software, and portions of an application that process requests and information are called server applications or server software. Client machines tend to run client software and server machines tend to run server software, however a server can be a client as well.

Figure 1:
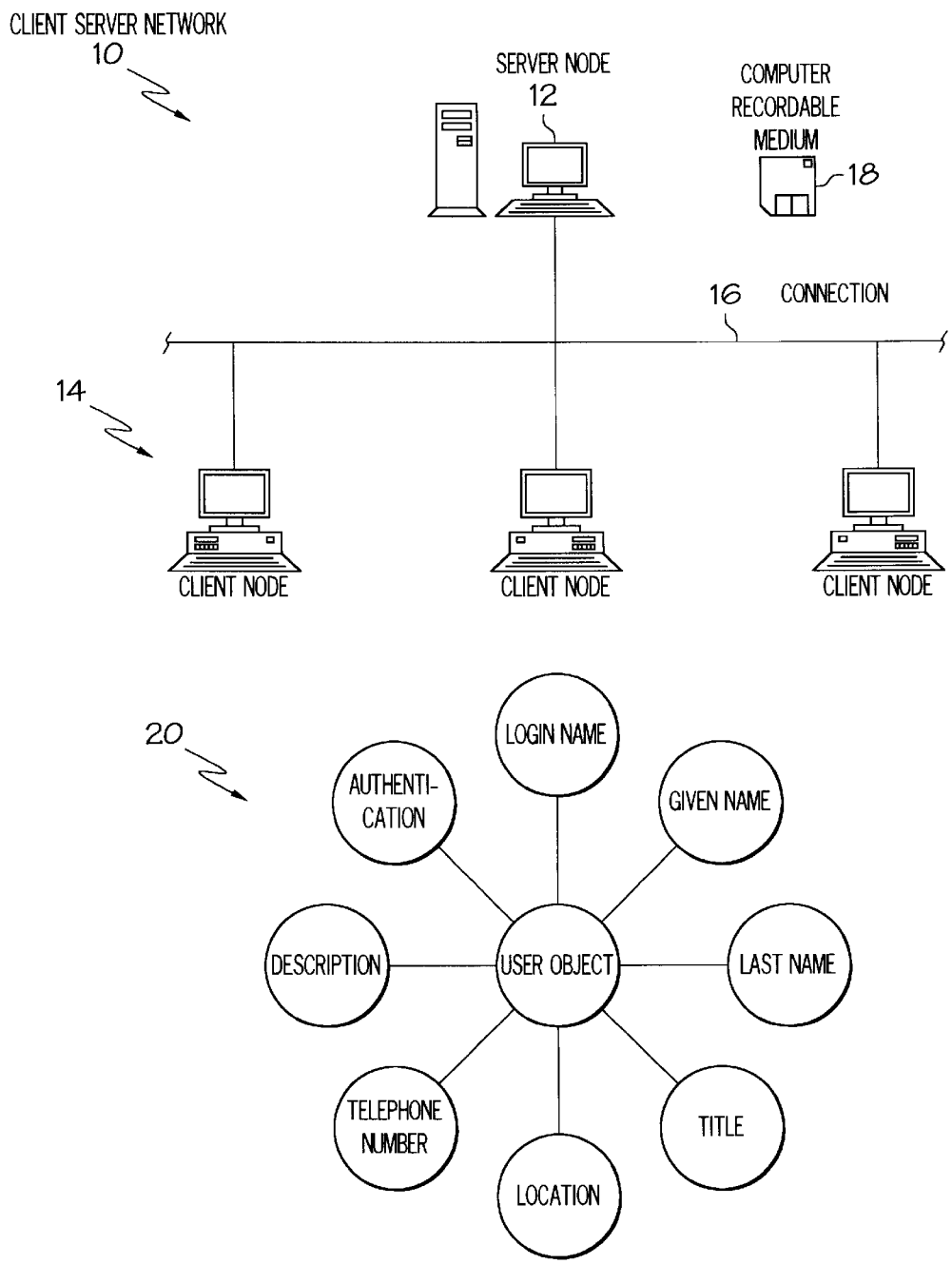
FIG. 1 depicts an example of interconnected nodes, a computer readable medium, and an object with several associated attributes.

FIG. 1 illustrates a sample client/server network 10. As one with ordinary skill in the art will readily appreciate, a client/server network is only one type of network, and a variety of other configurations, such as peer-to-peer connections, are also considered computer networks. In a client/server network, a plurality of nodes are interconnected such that the various nodes send and/or receive information to/from one another. As shown here, a server node 12 is interconnected to a plurality of client nodes 14 using a connection 16 such as a token ring, Ethernet, telephone modem connection, radio or microwave connection, or the like.

A computer readable medium 18, shown here as a floppy diskette, holds information readable by a computer, such as programs, data, files, etc. As one with ordinary skill in the art will readily appreciate, computer readable medium can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", etc.), and the like. Some types of computer readable medium, which are sometimes described as being nonvolatile, can retain data in the absence of power so that the information is available when power is restored.

One mechanism to maintain and access information across a network of interconnected nodes is a synchronized hierarchal database called a distributive directory, which is only one type of management service. One example of a distributed directory is the NOVELL DIRECTORY SERVICES ("NDS"), which is based on the X.500 network service protocol developed and published by the CCITT and Open Systems Interconnection Consortium. A distributed directory is a database in the sense that information is stored as opposed to the traditional definition under Codd and Date. Usually in the context of a client/server network, a distributive directory spans and is shared by multiple networking server nodes, although a single server node can also maintain a distributed directory. While distributed directories are often used with client/server networks, they are not necessarily limited to the context of such networks. Information in the distributive directory can be created, read, modified, and shared by other nodes, such as client nodes or other server nodes, who have applicable access rights to the distributed directory.

A management service contains a collection of objects, sometimes referred to as identities, with associated attributes or properties. For example, the object 20 is a User object that represents a human user. Beyond representing users, objects represent things that humans relate to when dealing with computers. For instance, some typical objects might represent virtually anything, whether imaginary or real.

The object 20 can have a variety of associated attributes, such as "Given Name", "Last Name", "Title", etc. Each associated attribute has a value, however, sometimes values are not associated with an attribute. For example, the value for the property "Given Name" might be "Owen". An attribute is usually based on an attribute type, which has an attribute syntax. The data which can be entered as a value associated with the attribute is dictated by the attribute syntax. For example, NDS version 4.1 includes the following attribute types: Back Link, Boolean, Case Exact String, Case Ignore List, Case Ignore String, Case Name, Counter, Distinguished Name, E-mail Address, Facsimile Telephone Number, Hold, Integer, Interval, Net Address, Numeric String, Object ACL, Octet List, Octet String, Path, Postal Address, printable String, Replica Pointer, Stream, telephone Number, Time, Timestamp, Typed Name, and Unknown. Each of these attribute types has a predetermined attribute syntax or data structure appropriate for the type of data that will be entered as a value.

Typically, the structure of the distributed directory is governed by a schema. The schema defines the rules for adding and managing objects and attributes of objects in the distributed directory. These rules are specified through a data dictionary that provides a standard set of data types or classes from which objects can be created. Each object in the distributed directory belongs to an object class that specifies which attributes are associated with the object. Generally, the schema is extensible so that it may be tailored to modify existing classes or add new classes.

The schema controls not only the structure of the individual objects, but also the relationship among the objects in the distributed directory. In controlling this relationship, the schema specifies subordination among object classes. That is, for every object there is a group of object classes from which subordinate objects can be formed. Objects that contain other objects are called container objects, which are the building blocks of the distributed directory. Objects that cannot contain other objects are known as non-container or leaf objects.

Figure 2:
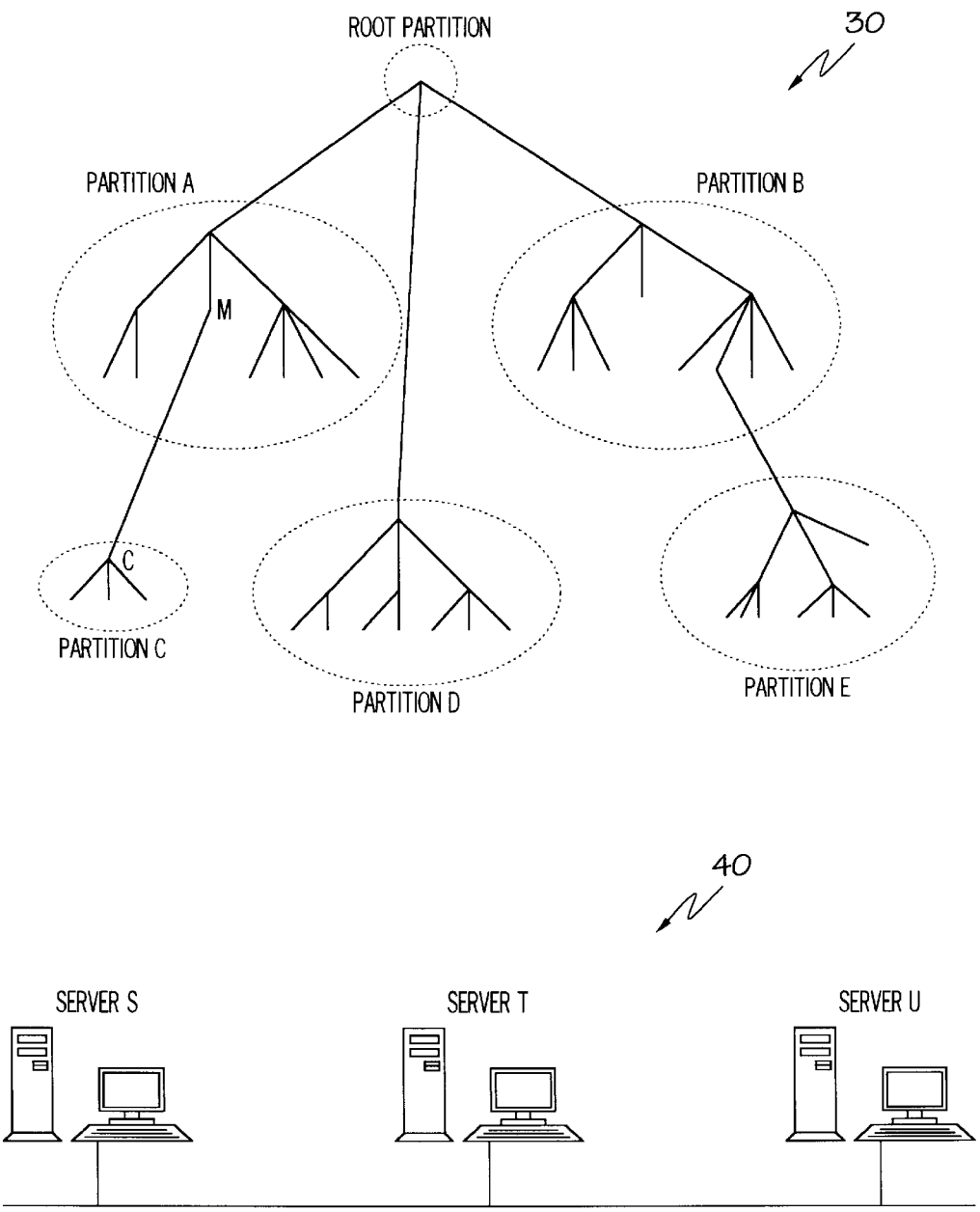
FIG. 2 depicts an example of a distributed directory and several servers accessing the distributed directory.

As shown in FIG. 2, the objects within the distributed directory 30 are often organized in a hierarchial structure, generally in the form of a tree, where the branching points and leaves represent the objects. In this hierarchy, objects closer to the root are superior or parents to objects further from the root, which are considered subordinate or children. For instance, the object M is the parent of the child object C. Object M can also be referred to as the container to object C. The distributed directory 30 is additionally organized in partitions, as illustrated by the dashed ellipses, with each partition comprising a plurality of objects organized as a logical sub-tree. Like objects, partitions closer to the root of the distributed directory 30 are called parent partitions to those further from the root, which are called child partitions. Each partition takes the name of the root object of the sub-tree. For instance, the root object of Partition C is the object C.

Multiple replicas of the partitions are stored across the network 40, wherein each insular server node holds a unique set of partitions and therefore a unique set of objects within that insular node. For instance, the following table demonstrates a sample partition organization in NDS:

|  | Root | Partition A | Partition B | Partition C | Partition D | Partition E |
|---|---|---|---|---|---|---|
| Server S | Master | — | Master | Master | Read | Master |

-continued

|  | Root | Partition A | Partition B | Partition C | Partition D | Partition E |
|---|---|---|---|---|---|---|
| Server T | Read Only | Master | Secondary | — | Only Master | — |
| Server U | — | Read Only | Secondary | — | Read Only | Secondary |

As suggested by this table, there are three basic kinds of replicas in NDS. With a Read Only replica, clients can read entries from this replica, but cannot change entries. Each partition can have zero or more Read Only replicas. With a Secondary replica, clients can read, write, create and destroy entries in the distributed directory by accessing this replica. Each partition has zero or more Secondary replicas. A Master replica acts like a Secondary replica, but clients can additionally make structural changes by accessing the master replica, such as splitting and combining partitions, or creating and removing replicas. Each partition has exactly one Master replica.

In addition to the three types of replicas illustrated in the table, a fourth kind of partition, called subordinate references, are also used to coordinate partitions between a plurality of nodes. A subordinate reference does not store a replica of its partition data. Rather, it is a skeleton: it stores only attributes to the partitions root most object. Whenever a server holds a complete replica (i.e. Master, Secondary or Read Only) of a partition, but not a directly subordinate partition, it keeps a subordinate reference of the subordinate partition. Referring to FIG. 2 and the table, Server T holds a subordinate reference for Partition C (since it keeps a replica of Partition A) and Partition E (since it keeps a replica of Partition B). Server T ends up with a replica of each partition when subordinate references are included. Likewise, Server U holds a subordinate reference for Partition C (since it keeps a replica of Partition A). But Server U does not hold a replica of each partition: the Root Partition is absent. With subordinate references, a server can walk up and down the name tree across partition boundaries.

In order to provide schema independence, the schema must have support for horizontal growth, vertical growth, semantic understanding and a querying ability of databases based on such a dynamic and incremental schema in the system. The horizontal growth provides for the incremental adaptive learning by ways such as understanding aliases. The vertical growth provides support of new elements. The semantic understanding provides for the interpretation of the properties of the entities/objects involved.

These requirements can be achieved by permitting the entry and query functions to employ attributes in a flexible way. The adaptive schema provides for the creation of schema in any arbitrary form, storage of the same, and the "intelligence" to correlate between schemata in different form and arrive at an equivalent definition.

Figure 3:
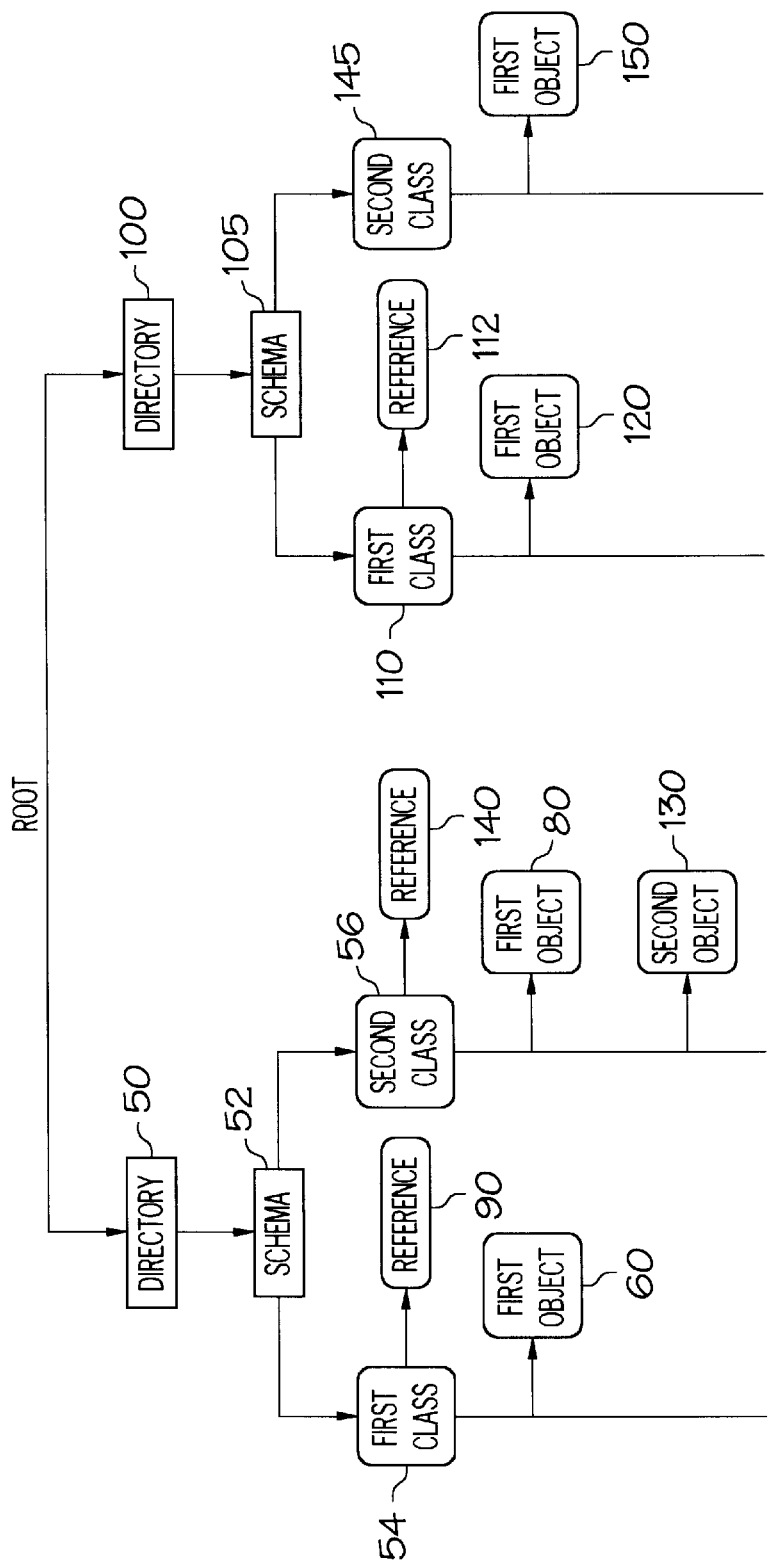
FIG. 3 depicts an example of a distributed directory with adaptive schema.

FIG. 3 depicts the adaptive schema of the present invention. The present invention of an object oriented directory 50 for use with a computer network comprises a first class one object 60 instantiated from a first class 54 of a first schema 52 from a first directory 50, wherein the first class one object 60 represents an entity. The object oriented directory 50 also comprises a first class two object 80 instantiated from a second class 56 of the first schema 52 from the first directory 50, wherein the first class two object 80 is a first attribute of said first class one object 60. The object oriented directory 50 also comprises a first reference 90 associated with the class one object 60 of the first directory 50 which refers to a first class one object 120 instantiated from a first class 110 of a second schema 105 from a second directory 100, wherein the second schema 105 is distinct from the first schema 52 and wherein the first class one object 120 of the second directory 100 is related to the first class one object 60 of the first directory 50.

In another embodiment of the present invention, the object oriented directory further comprises a second class two object 130 instantiated from the second class 56 of the first schema 52 from the first directory 50, wherein the second class two object 130 is a second attribute of the first class one object 60.

In yet another embodiment of the present invention, the object oriented directory further comprises a second reference 140 associated with the first class two object 80 of the first directory 50 which refers to the first class two object 150 instantiated from a second class 145 of the second schema 105 from the second directory 100, wherein the first class two object 150 of the second directory 100 is related to the first class two object 80 of the first directory 50.

Figure 4:
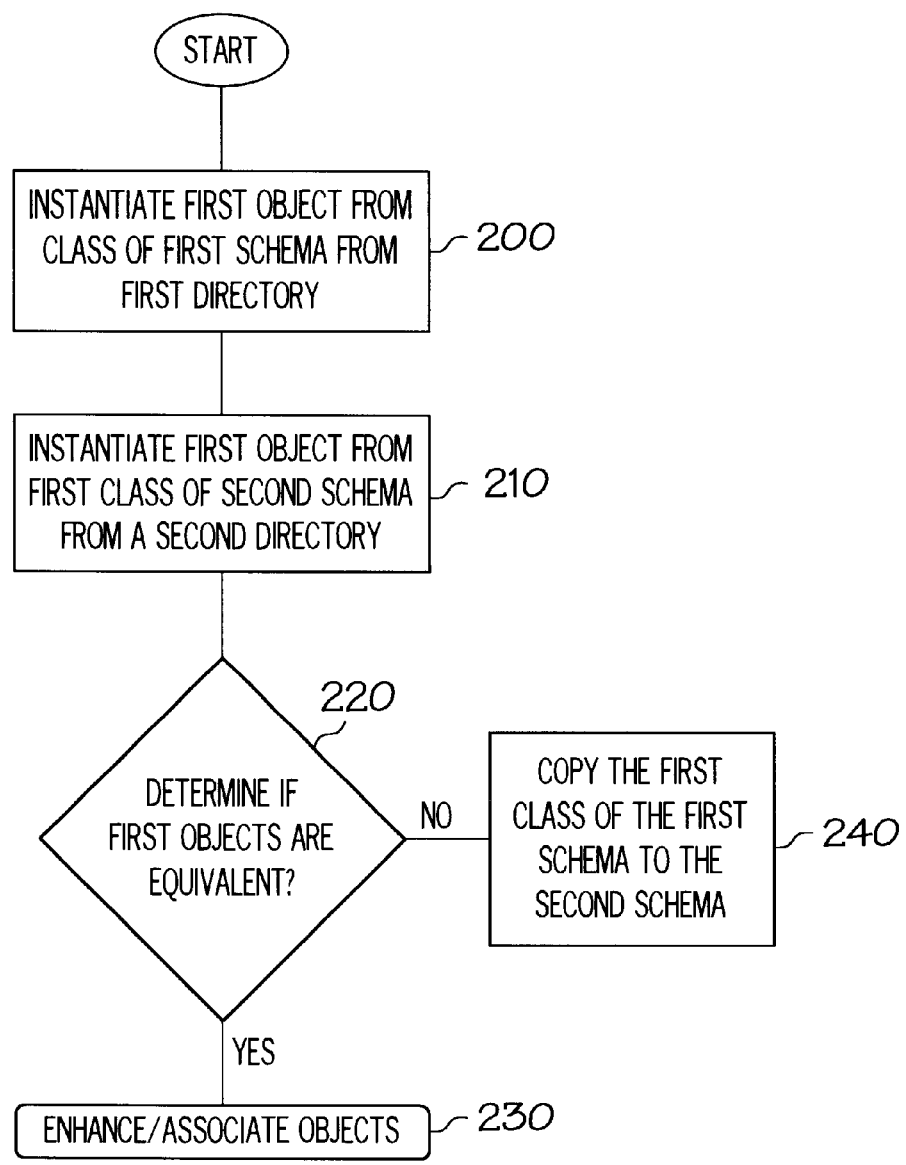
FIG. 4 depicts a flow chart of the steps performed by the Schema Engine for the adaptive schema of the present invention.

Another embodiment of the present invention is a method for interacting between a first directory 50 and a second directory 100. FIG. 4 depicts a flowchart of the method of interacting. The first step 200 is instantiating a first object 60 from a first class 54 of a first schema 52 from the first directory 50. The next step 210 is instantiating a first object 120 from a first class 110 of a second schema 105 from a second directory 100. The third step 220 is a determination of whether the objects are equivalent. If the objects are determined to be equivalent, the objects are then associated 230 to each other. If the objects are determined not to be equivalent 240, the first class 54 and the second class 56 of the first schema 52 from the first directory 50 are added to the schema 105 of the second directory 100.

Figure 5:
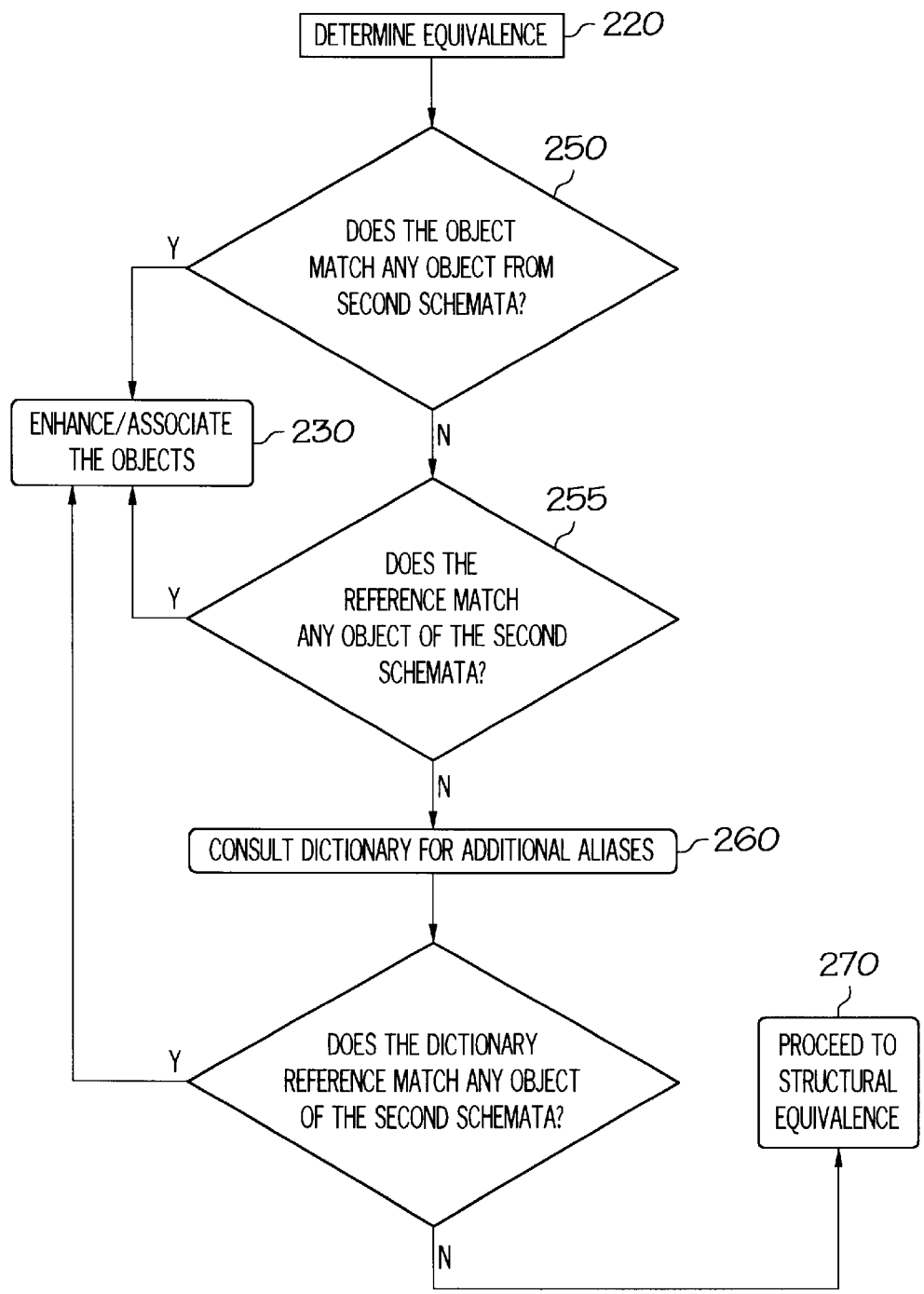
FIG. 5 depicts a flow chart of steps performed by the Schema Engine to determine semantic equivalence.

In another embodiment, the step of determining whether the objects are equivalent, further comprises the step of determining whether the first objects are semantically equivalent as shown in FIG. 5. The first step 250 is a determination of whether the first class object 60 of the first class 54 of the first schema 52 from the first directory 50 is the same as the first class object 120 or reference 112 of the first class 110 of the second schema 105 from the second directory 100. If they objects are the same, the objects are then associated 230 to each other. If the objects are not the same, the reference 90 of the first class object 60 are compared against the first class object 110 and reference 112 of the second schema 105 from the second directory 100. If one of the reference 90 match the first class object 120 or reference 112, then the objects are associated 230 to each other.

In yet another embodiment, if the step of determining equivalence among the reference 90 and the first class object 120 or reference 112 fails, then a dictionary 260 can be referenced for other aliases to utilize in determining whether the objects are equivalent. If the objects are determined to be semantic equivalents, then the objects are associated 230 to each other.

Figure 6:
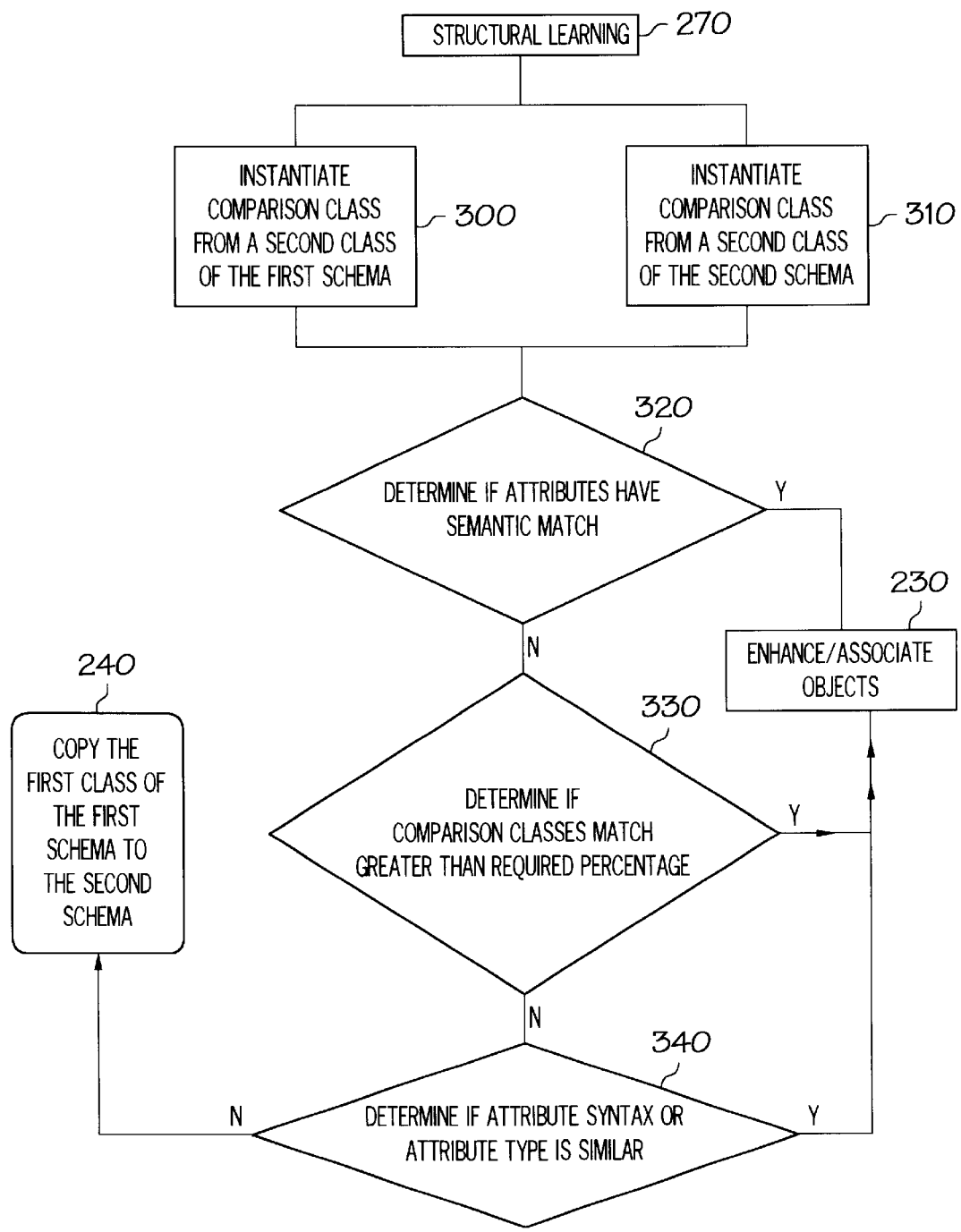
FIG. 6 depicts a flow chart of steps performed by the Schema Engine to determine structural equivalence.

In another embodiment of the present invention, if the step of determining semantic equivalents fails (i.e., no match for the object is found in the second schema 105), the method further comprises determining whether a structural equivalent 270 exists in the second schema 105. Structural learning (i.e., the steps of determining whether a structural match exists) comprises the comparison of the attributes and attributes syntax or type. Structural learning compares objects of the second class 56 of the first schema 52 from the first directory with the second class 145 of the second schema 105 from the second directory 100. The steps of structural learning 270 are depicted in a flow chart in FIG. 6. A first comparison class is instantiated 300 from a second class 56 of the first schema 52 from the first directory 50. This comparison class contains all of the attributes of the network entity. A second comparison class is instantiated 310 from a second class 145 of a second schema 105 from the second directory 100. The comparison classes are compared to determine if they are identical. If the comparison classes are identical, the first object 60 of the first class 54 of the first schema 52 from the first directory 50 is associated 230 with the first object 120 of the first class 110 of the second schema 105 from the second directory 100.

In yet another embodiment of the present invention, the structural learning further comprises the step 330 of determining whether at least a certain percentage of the first comparison class is identical to the second comparison class. The required percentage can be defined at either the server or client level. The required percentage match could range from about 1 percent to about 99 percent. A more preferred percentage is at least about 25 percent, an even more preferred percentage is at least about 50 percent, and a most preferred percentage of at least about 75 percent. If the comparison classes have at least the required percentage match, the first object 60 of the first class 54 of the first schema 52 from the first directory 50 is associated 230 with the first object 120 of the first class 110 of the second schema 105 from the second directory 100.

In another embodiment of the present invention, structural learning further comprises the step 340 of determining whether the syntax of the comparison classes are identical. Each object of the second class 56 has an attribute type which has a predetermined attribute syntax or data structure appropriate for the type of data that will be entered as a value. If the comparison classes have identical attribute type and syntax, the first object 60 of the first class 54 of the first schema 52 from the first directory 50 is associated 230 with the first object 120 of the first class 110 of the second schema 105 from the second directory 100.

In another embodiment of the present invention, the step of associating/enhancing 230 the objects further comprises copying the first class 54 of the first schema 52 from the first directory 50 to the reference 112 of the first class 110 of the second schema 105 from the second directory 100; and copying the reference 112 of first class 110 of the second schema 105 from the second directory 100 to the reference 90 of the first class 54 of the first schema 52 from the first directory 50. In another embodiment, the second class 56 of the first schema 52 from the first directory 50 is copied to the second class 145 of the second schema 105 from the second directory 100. Likewise, the second class 145 of the second schema 105 from the second directory 100 is copied to the second class 56 of the first schema 52 from the first directory 50.

In another embodiment of the present invention, the user can select whether to always associate the objects, to ask the user before associating, or to never associate the objects.

The present invention of adaptive schema utilizes a special type of object called the Primitive Conceptual Object ("PCO"). The PCO is a definition which is created. It is composed of either Resource Definitions and/or Attribute Definitions. The Resource Definitions are composed of Attribute Definitions. The Attribute Definitions are the building blocks of the adaptive schema. A single Attribute Definition can give its property/characteristic to any number of Resource Definitions.

The PCO can also contain "aliases". There is a difference in the concept of "aliases" in the conventional distributive directory and the adaptive schema of the present invention. In the conventional distributive directory, alias means the same object in some other or the same content. In the adaptive schema of the present invention, alias is a synonym to an object. The alias is just another semantic meaning for an object.

Figure 7:
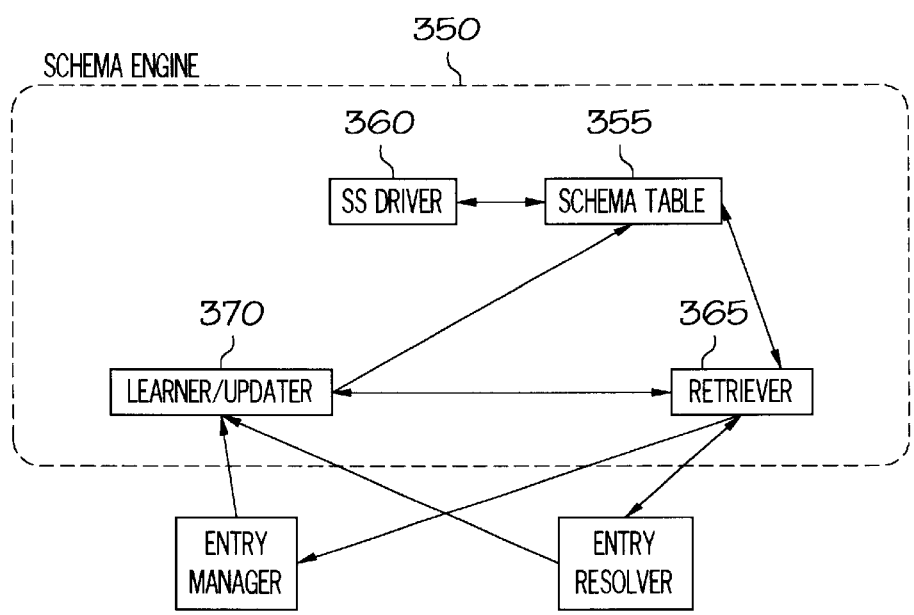
FIG. 7 depicts a flow chart of the Schema Engine Components and Interfaces.

The present invention utilizes a Schema Engine as part of the schema that comprises the adaptive learning component. FIG. 7 depicts the Schema Engine Components and Interfaces. The Schema Engine 350 contains the logic of how the directory with adaptive schema behaves. The Schema Engine 350 comprises the following sub-components: Schema Table 355, SS Driver 360, Retriever 365 and Learner/Updater 370. The Schema Table 355 contains all information about the schema governing each object/attribute. The Schema Table 355 contains a list of PCOs and their aliases. The PCOs could be Attribute Definitions and/or Resources Definitions. The Schema Table is only concerned with the definitions. The Schema Table 355 does not contain any instance values. The Schema Table 355 acts as a repository of all the definitions with their full information. The SS Driver 360 is the Sub System Driver. This driver controls the subsystem, updates the Schema Table, etc. In addition, the SS Driver 360 initializes and shuts down the Schema Engine. The Retriever 365 interacts with the Schema Table 355 to obtain schema definitions, aliases, etc. The Learner/Updater 370 updates the Schema Table 355 when it has "learned" any new information. The Learner/Updater 370 also checks for conflicts in schema.

The Schema Table 355 is built with a list of the PCOs and a list of their aliases. The table below depicts an example of the Schema Table:

| Schema Entry (PCOs) | Aliases |
| --- | --- |
| Book | Novel, Magazine |
| User | Person, Employee |
| Printer | Printing Device |
| Name | title, surname, firstname |

In the Table above, "Book", "User" and "Printer" are Resource Definitions and "Name" is an Attribute Definition. This "Name" can be used by many other Resource Definitions as a building block. In the Schema Table, there can only be one Schema Entry for each definition.

Figure 8:
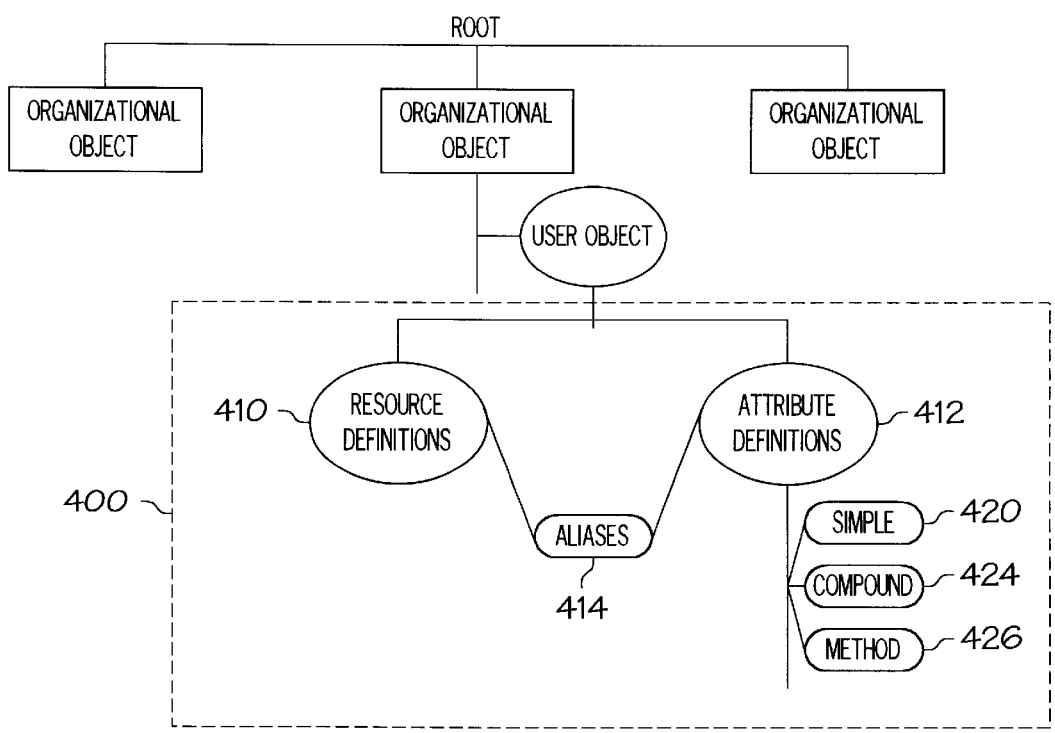
FIG. 8 depicts an example of a distributive directory with adaptive schema and the Primitive Conceptual Object.

FIG. 8 details the PCO structure in a distributive directory with the adaptive schema. The PCO 400 is composed of the Resource Definitions 410, Attribute Definitions 412 and Aliases 414. The Attribute Definitions 412 can consist of Simple Attributes 420, Compound Attributes 424 and Method Attributes 426. The Simple Attribute 412 is one of the ASN types: integer, boolean, long, float, string, etc. The Method Attribute 426 is also a basic attribute except the attribute can be executed. The Compound Attribute 424 consists of Simple and/or Method Attributes. A listing of the PCOs is stored in the Schema Table 355 of the Schema Engine 350.

At least two types of learning can take place under the present invention: Semantic Learning and Structural Learning. In Semantic Learning, the Schema Engine attempts to find a semantic or a meaning match between the definitions. The Schema Engine may reference a dictionary to aid the Semantic Learning. Whereas, Structural Learning attempts to compare the structures of the two definitions to determine if the definitions are equivalent. The required percentage match can be defined by the client or the server software. The Table below gives a example of this Structural Learning.

| Definition A | Definition B |
| --- | --- |
| Attribute E | Attribute E |
| Attribute F | Attribute F |
| Attribute G | Attribute X |
| Attribute H | Attribute Y |

In the above example, the definitions have a 50% match. If the threshold for Structural Learning had been set below or at 50%, the Schema Engine would proceed as if a semantic match had been obtained. In addition, a comparison may be made of the attribute type or syntax in order to determine if there is a match for the definitions.

In another embodiment of the present invention, every schema object of the present invention has a method attribute called "findAlias". If a particular object does not want to use the normal way of semantic comparison or the object has its own unique way of establishing semantic/structural equivalence, then this method attribute could be executed to determine a match with another object. By default, this method attribute is null and the schema object uses the default semantic/structural equivalence implementation.

After the learning is complete, the Directory User can either choose to accept or reject the learned information. The user through the client software or the network administrator through the server software can customize the schemata learning through a number of parameters. Some of the parameters include: (1) which directory to use, (2) how long to store the learned information, (3) whether to disable or enable certain/all definitions, (4) whether to enable or disable alias learning and/or structural learning and (5) select the percentage match required to conclude that the definitions are equivalent.

When most distributive directories attempt to find a value from another directory, the schema sends out a Light-weight directory access protocol (LDAP) request or some equivalent request. Directory Access Protocol (DAP) is a standard protocol to communicate between directories. LDAP is a subset of DAP which helps to access data in the directory. In the present invention, LDAP is used as one of the ways of deploying an adaptive directory. In distributive directories with adaptive schemata, the schema sends out both the LDAP request and an LDAP control. The LDAP control contains the complete definition and its attributes. The LDAP control contains all the information the other distributive directory needs to utilize adaptive learning. If the other distributive directory does not contain the adaptive schema, the LDAP control is just ignored. Likewise, if a distributive directory with adaptive schema receives a LDAP request but not a LDAP control, it will process the request normally without any schemata comparison. The LDAP control is dropped and only the LDAP request is processed. Thus, distributive directories with adaptive schemata have the ability to interact with conventional distributive directories.

Figure 9:
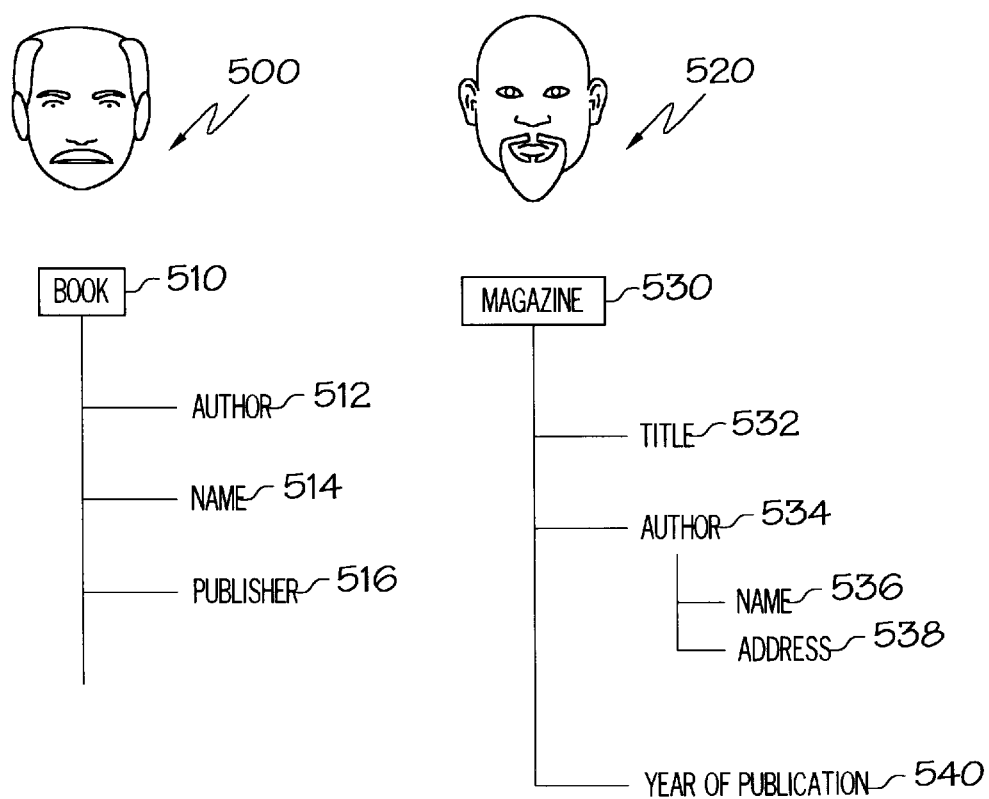
FIG. 9 depicts an example of the communication problem faced by humans and distributive directories.

FIG. 9 depicts the following example. Person "A" 500 describes a "book" 510 as having the attributes of author 512, name 514 and publisher 516. Person "B" 520 describes a "magazine" 530 as having the attributes of title 532, author 534 (composed of the attributes name 536 and address 538), and year of publication 540. The definitions of these two persons are in different form. However, they are both talking about reading material. If Person "B" were to ask Person "A" if he has a magazine, Person "A" may not know the semantic meaning or structure of "magazine". This is where the Person "A" tries to match or associate magazine with the knowledge meanings he has. He may find "Book" as a match and give information about books to Person "B".

Figure 10:
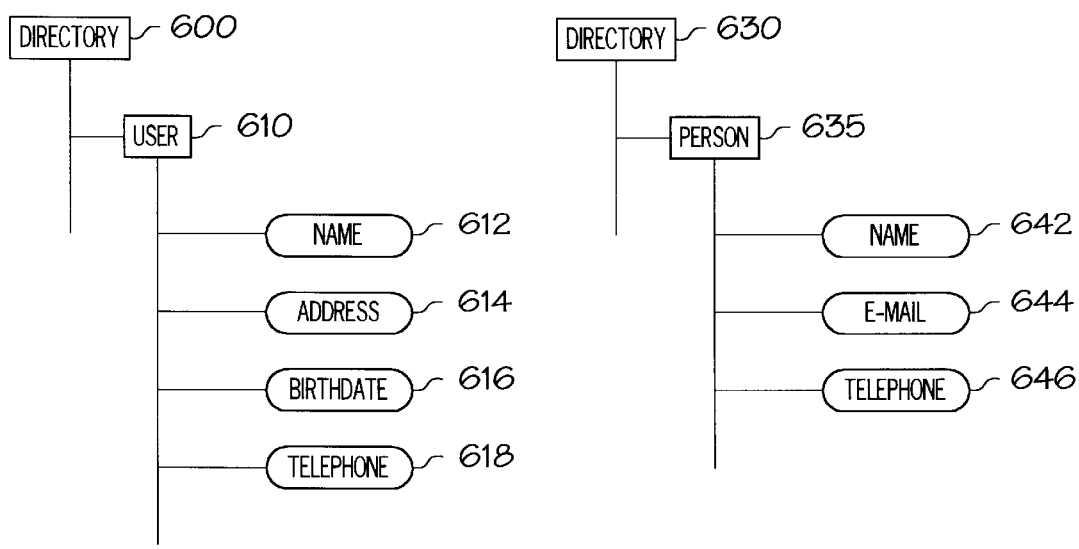
FIG. 10 depicts an example of a distributive directory without an adaptive schema component.

When utilizing directories of different structures and configurations, a similar communication problem can develop in the schemata of various distributed directories. FIG. 10 details an example of this confusion. In this example a distributive directory is searching all Users for their telephone numbers. The first directory 600 contains an object User 610. The User object 610 has attribute definitions of Name 612, Address 614, Birthdate 616 and Telephone 618. The second directory 630 contains the object Person 635. The Person object 635 has attribute definitions of Name 642, E-mail 644 and Telephone 646. The schema of the first directory is searching for "User" in the schema of the second directory. Under existing distributive directory technology, the distributive directory of the first directory 600 will not be able to obtain the information. However, with the present invention's adaptive schemata, the request would most likely succeed.

Figure 11:
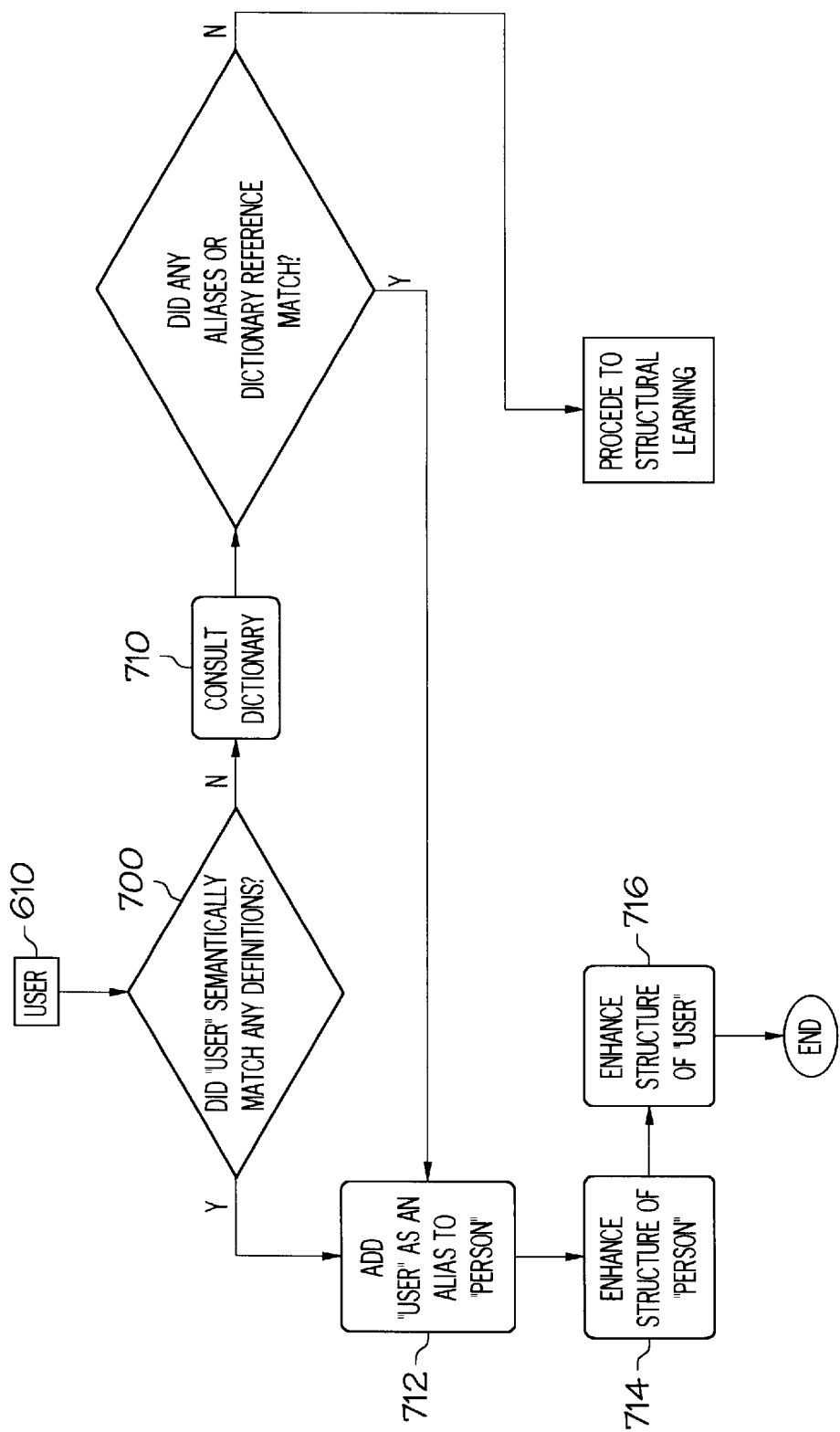
FIG. 11 depicts a flowchart of the steps performed by the Schema Engine for the distributive directory of FIG. 10.
Figure 12:
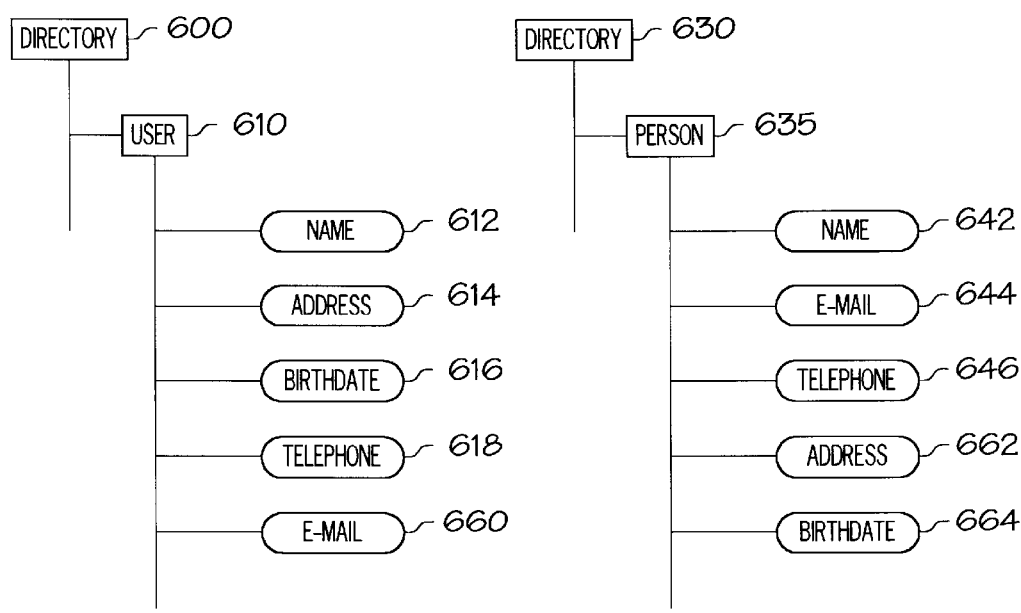
FIG. 12 depicts the enhanced distributive directories with adaptive schemata.

FIG. 11 details the process that the adaptive schema would undertake for the above example. First the adaptive schemata engine attempts to semantically match 700 "User" or its "aliases" with "Person" or its "aliases". In a preferred embodiment of the present invention, the schema engine may refer to a dictionary 710 for additional "aliases". If there is a semantic match, "User" is added as an alias to the "Person" definition 712 and "Person" is added as an alias to the "User" definition. Then the structure/attributes of "Person" is enhanced 714 using the structure of "User". The attributes of "User" are copied to the attributes of "Person". Likewise, the structure/attributes of "User" is enhanced 716 using the structure of "Person". The resulting "enhanced" structure/attributes are shown in FIG. 12. As shown in FIG. 12, the attribute "E-mail" 660 has been added to the "User" 610 object and the attributes "Address" 662 and "Birthdate" 664 have been added to the "Person" 635 object.

Figure 13:
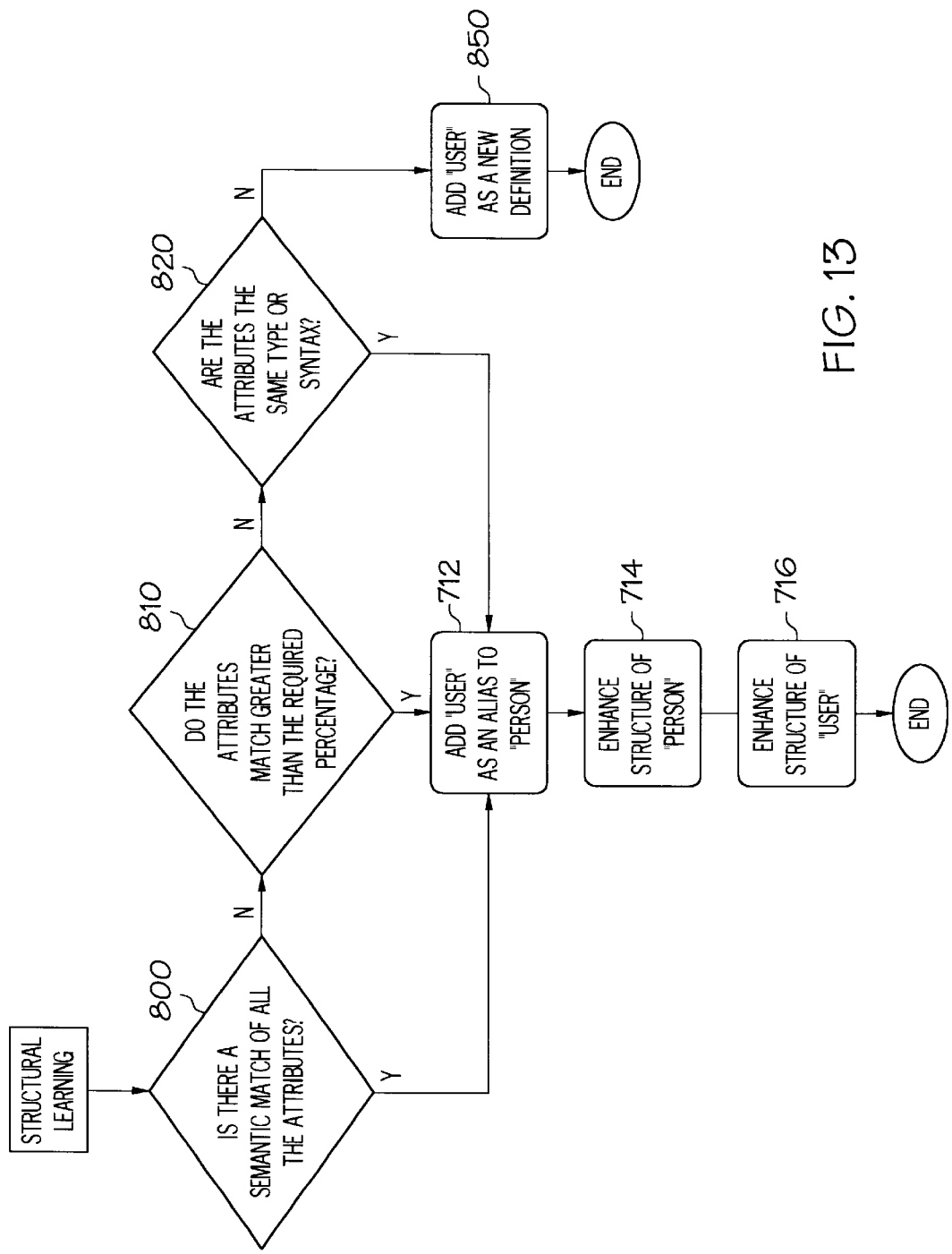
FIG. 13 depicts a flowchart of structural learning for the distributive directory of FIG. 10.

FIG. 13 details what action is performed if a semantic match between the two objects is not obtained. If the semantic match fails, the Schema Engine proceeds to Structural Learning, where the attributes/structure of "User" are compared against the objects of the second schema from the second directory to find any structural match. Structural learning can comprise various matching techniques such as: semantic matching of the attributes 800, requiring a certain percentage match of the attributes 810, and semantic matching of the attribute syntax or attribute type 820. In one embodiment of the present invention 810, a structural match is defined as "X" percent attributes of "User" matching the attributes of an object of the second schema from the second directory. The required matching percentage can be selected either at the client or the server level. If the required percent structural match is obtained, then the schema engine proceeds to enhance the definition of "User" and "Person" as in the semantic equivalence portion. If the required percentage structural match is not obtained, the "User" object and its structure/attributes are added 850 to the second directory as a new definition (i.e., a Primitive Conceptual Object "PCO"). In another embodiment of the present invention 820, the attribute syntax or type of integer (e.g., ten digits) could be searched in the other schema for a structural match of objects comprising the same attribute syntax or type.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Likewise, the invention has utility in systems other than NetWare, including, for example, Windows NT, Windows 95, OS/2, Macintosh, Vines, Unix, etc. In addition, the invention is applicable to management systems other than NDS, such as SAM, ADS, or STREET TALK by BANYAN. Accordingly, this invention is intended to embrace all alternatives, modifications, and variations that fall within the spirit and broad scope of the amended claims.

What is claimed is:

1. In a computer readable medium, an object oriented directory for use with a computer network, comprising:
    (a) a first class one object instantiated from a first class of a first schema from a first directory, wherein said first class one object represents an entity;
    (b) a first class two object instantiated from a second class of the first schema from the first directory, wherein the first class two object is a first attribute of said first class one object; and
    (c) a first reference associated with said class one object of the first directory which refers to a first class one object instantiated from a first class of a second schema from a second directory, wherein the second schema is distinct from the first schema and wherein the first class one object of the second directory is related to the first class one object of the first directory.

2. The object oriented directory of claim 1, wherein said entity is a network entity.

3. The object oriented directory of claim 1, wherein said attribute is a simple attribute.

4. The object oriented directory of claim 1, wherein said attribute is a compound attribute.

5. The object oriented directory of claim 1, wherein said attribute is a method attribute.

6. The object oriented directory of claim 5, wherein said method attribute comprises an alternative method for determining equivalence with another object.

7. The object oriented directory of claim 1, further comprising a second class two object instantiated from the second class of the first schema from the first directory, wherein said second class two object is a second attribute of said first class one object.

8. The object oriented directory of claim 1, further comprising a second reference associated with said first class two object of the first directory which refers to a first class two object instantiated from a second class of the second schema from the second directory, wherein the first class two object of the second directory is related to the first class two object of the first directory.

9. The object oriented directory of claim 8, wherein the first class of the first directory is the same as the first class of the second directory and wherein the second class of the first directory is the same as the second class of the second directory.

10. The object oriented directory of claim 8, further comprising a data structure storing said first class one object and said first reference.

11. The object oriented directory of claim 10, wherein said data structure stores said first class two object and said second reference.

12. In a computer system, a method for interacting between a first directory having a first schema and a second directory having a second schema, comprising the steps of:
   (a) instantiating a first object from a first class of a first schema from a first directory;
   (b) instantiating a first object from a first class of a second schema from a second directory, wherein the second schema is distinct from the first schema;
   (c) determining whether said first objects are equivalent; and
   (d) associating said first objects if said first objects are equivalent.

13. The method of claim 12, wherein the step of determining equivalence further comprises the step of determining whether said first objects are semantically equivalent.

14. The method of claim 13, wherein the step of determining semantic equivalence further comprises the step of accessing a dictionary.

15. The method of claim 13, wherein the step of determining equivalence further comprises the step of determining whether said first objects are structural equivalents.

16. The method of claim 15, further comprising the steps of:
   (a) instantiating a first comparison class from a second class of the first schema from the first directory, wherein said first comparison class comprises attributes of said first object of the first directory;
   (b) instantiating a second comparison class from a second class of the second schema from the second directory, wherein said second comparison class comprises attributes of said first object of the second directory;
   (c) determining whether said comparison classes are equivalent; and
   (d) associating said comparison classes if said comparison classes are structurally equivalent.

17. The method of claim 16, wherein the step of determining equivalence further comprises the step of determining whether said comparison classes are structural equivalents.

18. The method of claim 17, wherein the step of determine whether said first objects are structural equivalents further comprises the steps of:
   (a) comparing the attributes of the first comparison class with the attributes of the second comparison class; and
   (b) associating said comparison classes if greater than 25 percent of said attributes of the first comparison class match the second comparison class.

19. The method of claim 18, wherein the step of associating the comparison classes further comprises associating said comparison classes if greater than 50 percent of said attributes of the first comparison class match the second comparison class.

20. The method of claim 18, wherein the step of associating the comparison classes further comprises associating said comparison classes if greater than 75 percent of said attributes of the first comparison class match the second comparison class.

21. The method of claim 12, further comprising the step of
   (e) instantiating a second object from a second class of the first schema from the first directory, wherein said second object from the first directory is an attribute of said first object of the first directory;
   (f) instantiating a second object from a second class of the second schema from the second directory, wherein said second object from the second directory is an attribute of said first object of the second directory;
   (g) determining whether said second objects are equivalent; and
   (h) associating said second objects if said second objects are semantically equivalent.

22. The method of claim 21, wherein the step of associating second objects further comprises the steps of:
   (a) copying the second class of the first schema from the first directory to the second class of the second schema from the second directory; and
   (b) copying the second class of the second schema from the second directory to the second class of the first schema from the first directory.

23. The method of claim 12, wherein the step of associating first objects further comprises the steps of:
   (a) copying the first class of a first schema of the first directory to the first class of the second schema of the second directory; and
   (b) copying the first class of a second schema of the second directory to the first class of the first schema of the first directory.

24. The method of claim 12, further comprising the step of copying the first class and a second class of the first schema from the first directory to the second schema from the second directory if said first objects are not equivalent.

* * * * *